US012435685B2

(12) United States Patent
Guerrato

(10) Patent No.: US 12,435,685 B2
(45) Date of Patent: Oct. 7, 2025

(54) GAS SUPPLY SYSTEM

(71) Applicant: PHINIA DELPHI LUXEMBOURG SARL, Belvaux (LU)

(72) Inventor: Diego Guerrato, Gillingham Kent (GB)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/836,476

(22) PCT Filed: Feb. 1, 2023

(86) PCT No.: PCT/EP2023/052461
§ 371 (c)(1),
(2) Date: Aug. 7, 2024

(87) PCT Pub. No.: WO2023/148228
PCT Pub. Date: Aug. 10, 2023

(65) Prior Publication Data
US 2025/0137420 A1    May 1, 2025

(30) Foreign Application Priority Data

Feb. 7, 2022   (GB) ..................................... 2201555

(51) Int. Cl.
*F02M 21/02*    (2006.01)
(52) U.S. Cl.
CPC ...... *F02M 21/0224* (2013.01); *F02M 21/023* (2013.01); *F02M 21/0245* (2013.01)
(58) Field of Classification Search
CPC ............ F02M 21/0245; F02M 21/023; F02M 21/0224
See application file for complete search history.

(56) References Cited

U.S. PATENT DOCUMENTS

| 4,750,869 A * | 6/1988 | Shipman, III ............ F17C 5/06 417/345 |
| 6,427,729 B1 * | 8/2002 | Teel ...................... F04B 45/061 141/2 |
| 9,541,236 B2 * | 1/2017 | Kuehl ....................... F17C 5/06 |

FOREIGN PATENT DOCUMENTS

| DE | 102017217609 A1 | 4/2019 |
| WO | 2009035311 A1 | 3/2009 |
| WO | 2013056295 A1 | 4/2013 |

OTHER PUBLICATIONS

International Search Report for PCT/EP2023/052461 dated May 12, 2023, 3 pages.
(Continued)

*Primary Examiner* — Kevin A Lathers
(74) *Attorney, Agent, or Firm* — WARNER NORCROSS + JUDD LLP

(57) ABSTRACT

A gas supply system comprises a first valve arrangement permitting gas to be supplied from a gas tank to first and second storage chambers configured to accommodate gas and compression fluid, and permit gas to be delivered from the storage chambers. A second valve arrangement permits compression fluid to flow to/from the storage chambers. Compression fluid is delivered to the first and second storage chambers via the second valve arrangement by a hydraulic pump having a primary and secondary drive inputs. Compression fluid is evacuated from the first and second storage chambers via a hydraulic motor having a drive output. The drive output of the hydraulic motor is coupled to the secondary drive input of the hydraulic pump, such that when compression fluid is evacuated from the first or second storage tank through the hydraulic motor, energy is recovered from the compression fluid to drive the hydraulic pump.

20 Claims, 7 Drawing Sheets

(56) References Cited

OTHER PUBLICATIONS

Machine assisted English translation of DE102017217609A1 obtained from <https://patents.google.com/patent> on Jul. 30, 2024, 6 pages.

* cited by examiner

GAS SUPPLY SYSTEM

CROSS-REFERENCE TO RELATED APPLICATIONS

This application is the U.S. National Stage of International Application No. PCT/EP2023/052461 filed on 1 Feb. 2023, which claims priority to and all advantages of United Kingdom Application No. 2201555.6 filed on 7 Feb. 2022, the contents of which are incorporated herein by reference.

TECHNICAL FIELD

The invention relates generally to a gas supply system for supplying gaseous fuel to a power system, which may be an internal combustion engine. In particular, though not exclusively, the invention relates to a system which uses hydrogen as the source of fuel to be supplied to an internal combustion engine. The internal combustion engine may form a part of a gas-fueled vehicle.

BACKGROUND

There is an increasing need in modern technology areas to move away from fossil fuels as a source of energy and to replace them with renewable energy sources. This affects the transport sector significantly where conventional gasoline or diesel fueled vehicles are being replaced by battery electric vehicles (BEV). However, current BEV technology is yet to achieve energy densities comparable with traditional fuels which compromises their range of travel. This limits the attractiveness of BEVs to a subset of users and for heavy duty applications where the size of the battery needed to achieve range and load carrying requirements is impractical.

A known alternative is to use a conventional internal combustion engine that is fueled by hydrogen gas. Hydrogen as an energy carrier and main fuel is a promising option due to its carbon-free content, wide flammability limits and fast flame speeds. For spark-ignited internal combustion engines, utilizing hydrogen in direct injection has been proven to achieve high engine power output and efficiency combined with low emissions. Extensive research supports the feasibility of this solution, but new challenges are faced related to the high pressures required when using hydrogen as a fuel in order to commercialise the technology on a wide scale. One challenge to using hydrogen is to deliver the gas reliably and at high pressures to the cylinders of the associated engine. For this purpose, a compression system may be required in order to decouple the engine from the main gas tank, which storage pressure varies with the amount of gas in the tank. Such a compression system presents a further parasitic loss on the system since it needs to be driven by the engine or an electric motor, and so it is desirable to maximise the efficiency of any such compression system. It is against this background that the invention has been devised.

SUMMARY OF THE INVENTION

Against this background, the invention provides a gas supply system for supplying gaseous fuel to a power system, comprising a first storage chamber and a second storage chamber, both storage chambers configured to accommodate a portion of gas and a portion of compression fluid. The system further comprises a first valve arrangement configured to permit gas to be supplied selectively to the first and second storage chambers from a gas tank and to permit gas to be delivered under pressure selectively from the first and second storage chambers to the power system; and a second valve arrangement configured to permit compression fluid to be delivered selectively to the first and second storage chambers, and to permit compression fluid to be evacuated from the first and second storage chambers; wherein compression fluid is delivered to the first and second storage chambers via the second valve arrangement by a hydraulic pump having a primary drive input and a secondary drive input, and wherein compression fluid is evacuated from the first and second storage chambers via a hydraulic motor having a drive output. Notably, the drive output of the hydraulic motor is coupled to the secondary drive input of the hydraulic pump, such that when compression fluid is evacuated from the first or second storage tank through the hydraulic motor, energy is recovered from the compression fluid to drive the hydraulic pump.

The examples of the invention extend to, and embrace, a method of operating a gas supply system, the system comprising a first storage chamber and a second storage chamber, a first valve arrangement for controlling the volume of gas in the first and second storage chambers, and a second valve arrangement for controlling the volume of compression fluid in the first and second storage chambers, the volume of compression fluid in the respective storage chambers serving to compress the volume of gas therein. The method comprises:

pumping, using a hydraulic pump, compression fluid selectively to one of the first storage chamber and second storage chamber, in synchrony with evacuating compression fluid, using a hydraulic motor, selectively from the other one of the first storage chamber and second storage chamber, and recovering energy from the flow of compression fluid through the hydraulic motor to assist in driving the hydraulic pump.

In the invention, gas can be supplied to the power plant from one of the two storage chambers, whilst the other storage chamber is being replenished with gas. During the replenishment, however, the hydraulic fluid from the depleted storage chamber is fed through the hydraulic motor which recovers some of the energy from the hydraulic fluid to assist driving the hydraulic pump. This reduces parasitic losses of operating the system thereby improving its efficiency.

In some examples of the invention, the primary drive of the hydraulic pump is driven by an electric motor. This decouples the hydraulic pump from the operation of the engine that is associated with the gas supply system, which may provide some benefits in term of flexibility in the way in which the hydraulic pump is driven. In other examples, the primary drive of the hydraulic pump may be driven by a power coupling to a vehicle engine.

The gas supply system of the invention may be operated in different modes in order to achieve certain desirable functionalities. For example, main operational modes may involve controlling the hydraulic fluid input into the storage chambers in order to deliver pressurised gas to the power plant. Other operational modes may involve refilling or 'priming' one or both of the storage chambers to ensure that the storage chambers accommodate an optimum volume of compression fluid, 'purging' one or both of the storage chambers of hydraulic fluid, and also 'idling' of the system, in cases where the supply of gas is required to be paused for a period of time.

In this context, the second valve arrangement may be operable in a first mode in which compression fluid is pumped by the hydraulic pump into one of said first and second chambers through the second valve arrangement thereby causing gas to be delivered from the same one of the first and second storage chambers through the first valve arrangement, whilst compression fluid is evacuated by the hydraulic motor through the second valve arrangement from the other of the first and second storage chambers, causing gas to be drawn into the same other one of the first and second storage chambers via the first valve arrangement.

Alternatively, or in addition, the second valve arrangement may be operable in a second mode, in which compression fluid is pumped by the hydraulic pump through the second valve arrangement but is not permitted to enter either of the first and second storage chambers, wherein the pumped compression fluid circulates through the second valve arrangement, through the hydraulic motor, and back to a compression fluid tank. This operational mode may be beneficial in a situation where the supply of gas needs to be paused, but the hydraulic pump continues to operate.

The second valve arrangement may also be operable in a third mode, in which compression fluid is pumped by the hydraulic pump through the second valve arrangement so as to fill one of the first and second storage chambers with compression fluid, whilst no compression fluid is delivered to or evacuated from the other one of the first and second storage chambers.

The second valve arrangement may also be operable in a fourth mode, in which compression fluid is evacuated by the hydraulic motor through the second valve arrangement and back to a compression fluid storage tank, whilst no compression fluid is delivered to or evacuated from the other one of the first and second storage chambers. This operational mode may be used to drain the storage chambers partly or fully, for example where there is an excess of hydraulic fluid in the storage chambers or where they need to be drained for service work.

The invention has particular utility where the power system is an internal combustion engine of a vehicle. It may also be used in stationary applications like electric generators that are driven by combustion engines. However, the invention may also supply gas to a consumer that is not an internal combustion engine.

Further optional and advantageous features are referenced in the detailed description and the appended claims.

BRIEF DESCRIPTION OF THE DRAWINGS

So that the invention may be better understood, reference will now be made by way of example only to the following drawings in which:

FIG. 1 is a perspective view of a gas compression system in accordance with an example of the invention, whereas

DETAILED DESCRIPTION OF THE EMBODIMENTS

The invention relates to the delivery of pressurised gas such as hydrogen to a power plant of a vehicle, which may be an automobile. The gas may be hydrogen gas which is known in the art as being used to fuel vehicles. The power plant may be an internal combustion engine that uses a gas such as hydrogen, but the power plant may also be a fuel cell system that uses hydrogen for conversion into electricity to be used in an electrical drive train of the vehicle.

Gas-fueled power plants usually require the delivery of gaseous fuel, hereinafter 'gas', at a narrow range of predetermined pressures. On-board storage tanks receive gas from a filling station at a certain pressure, usually about 700 bar, but also at about 350 bar. However, the pressure of gas in the tank will drop as the gas is used. A suitable apparatus is therefore desirable to provide an intermediate pressure boosting and/or regulation function to ensure gas is supplied to the power plant at a steady pressure throughout the filled capacity of the main gas tank.

Figure 1:
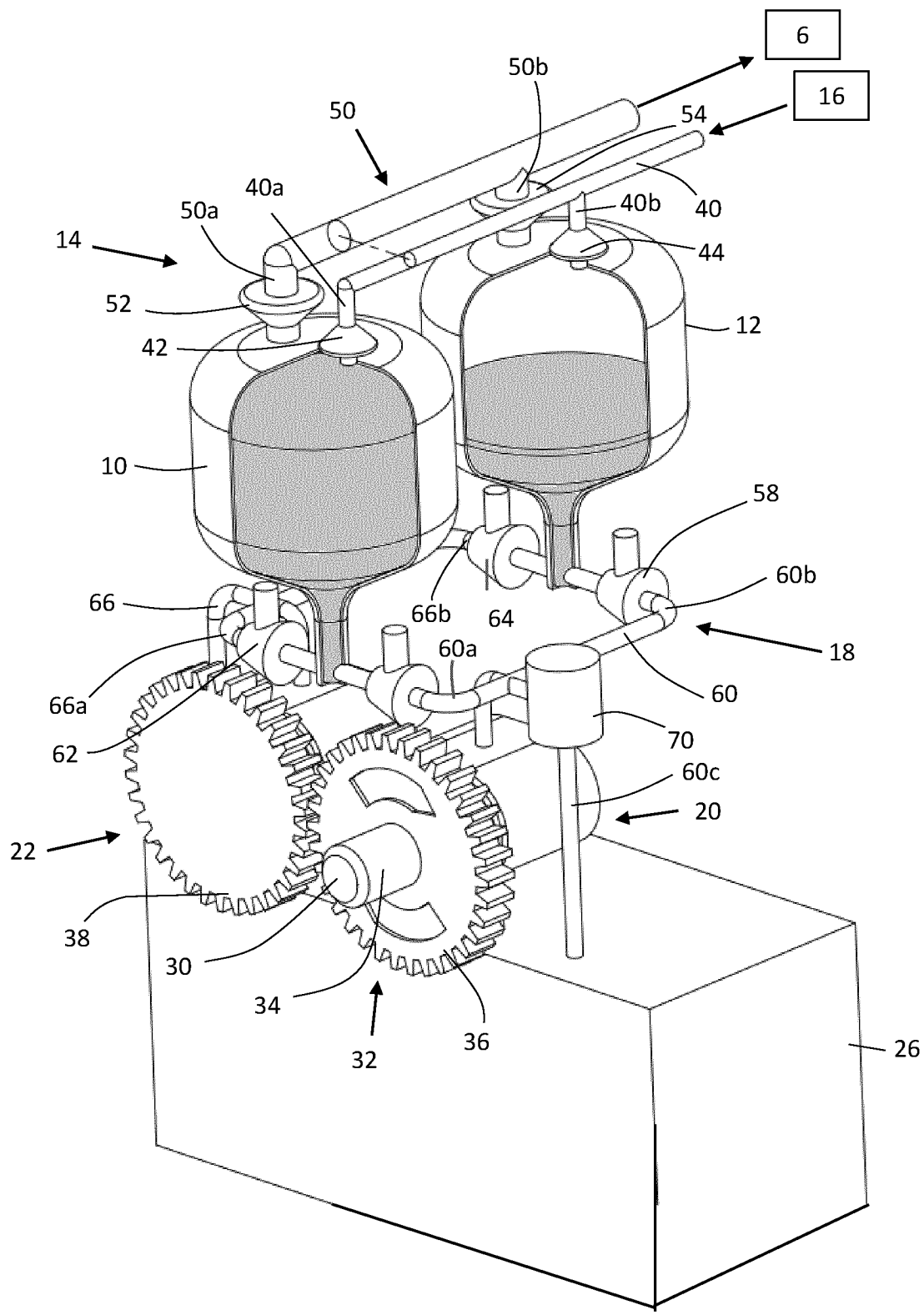
Figure 2:
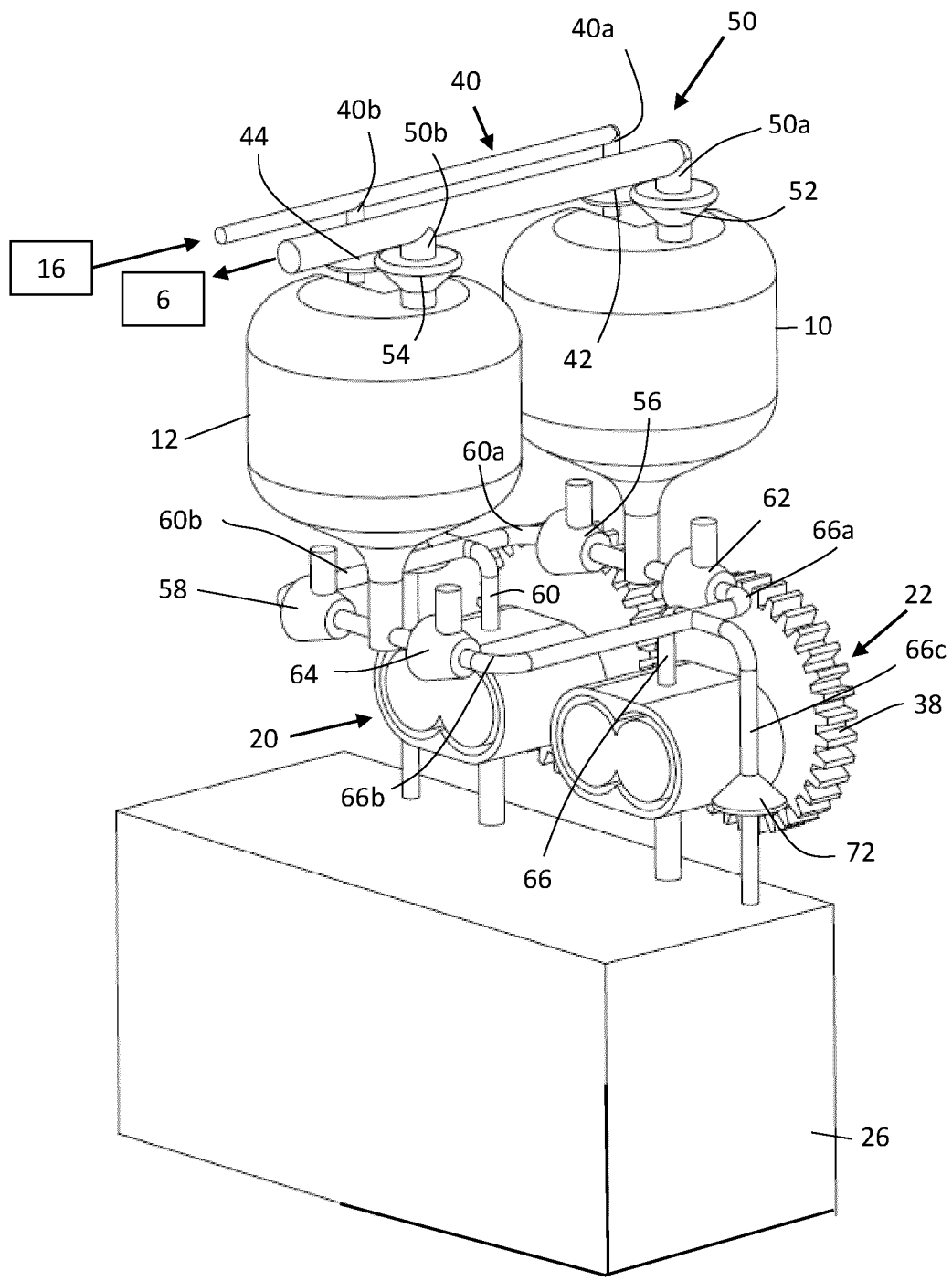
FIG. 2 is a view of the system from an opposing viewpoint.

FIG. 1 illustrates a system for supplying pressurised gas at a predetermined pressure level, or at least an acceptably steady range of gas pressures. Although in the following discussion the term 'hydrogen' may be used, it should be appreciated that the system in general may be applied to other gaseous fuels where a steady supply pressure is required. It should also be appreciated at this point that the system of the invention may be used to supply gas in contexts where it is not used specifically as a fuel. FIG. 2 illustrates the same system but from a reverse viewpoint, whereas FIG. 3 illustrates the system in schematic form.

Figure 3:
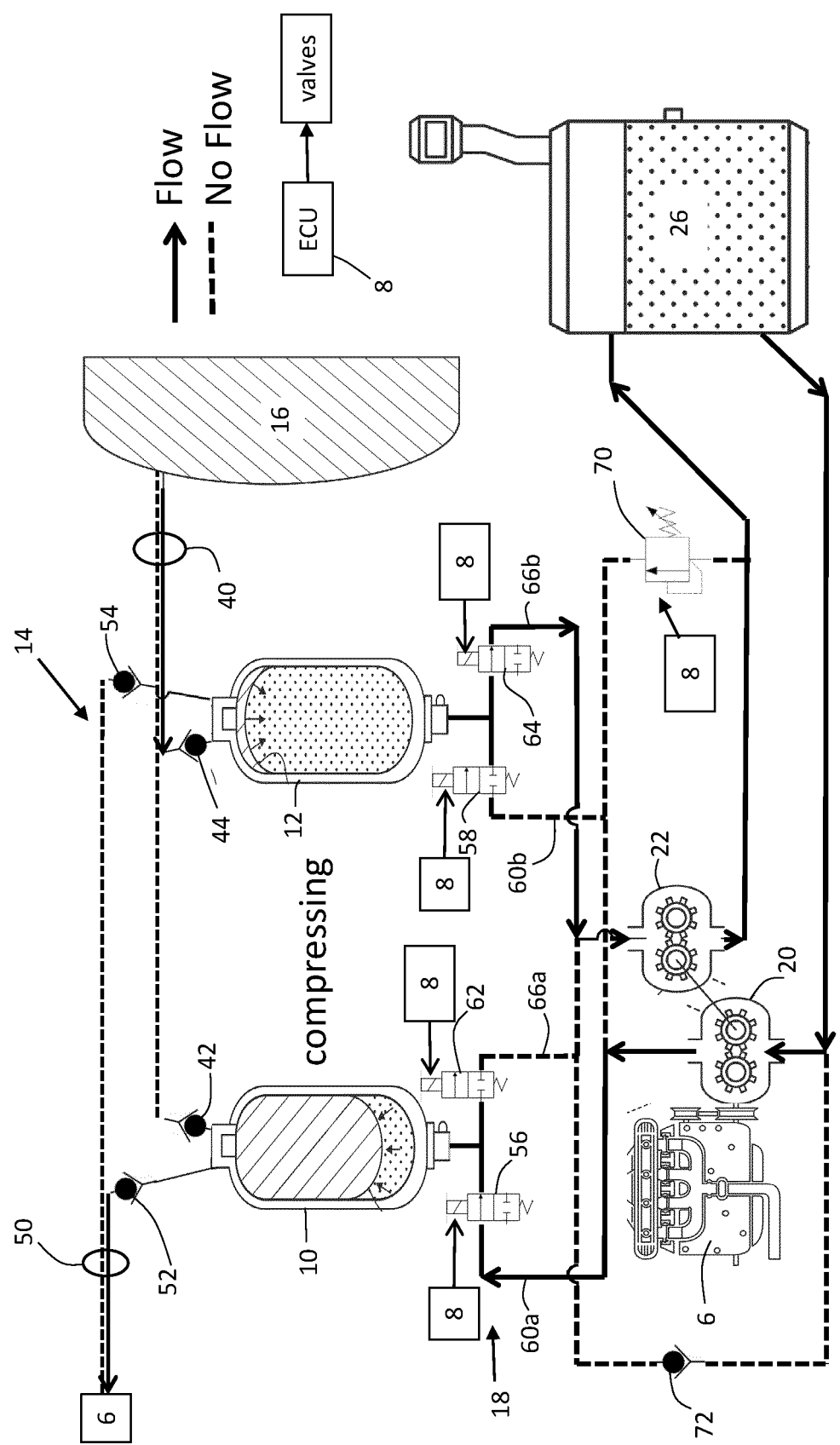
FIGS. 3 and 4 are schematic view of the system in FIGS. 1 and 2, as illustrated in a compression mode of operation.

Reference firstly will be made to FIGS. 1 to 3 to provide a system overview. A vehicle power system 2 includes a gas supply system 4 and a power plant 6, which is shown here as an internal combustion engine. An electronic control unit (ECU) 8 is shown connected to both the gas supply system 4 and the power plant 6 for controlling both systems, as will become apparent in the discussion that follows.

The gas supply system 4 comprises a first storage tank or chamber 10 and a second storage tank or chamber 12. In this example, both storage chambers are identical, although this is not essential. The storage chambers 10,12 are configured to accept a combination of gaseous fuel and also a compression fluid, such as a liquid like hydraulic oil, which is capable of compressing the gas in the storage chambers. Other liquids than oil may also be suitable, although currently oil is preferred for the compression fluid. The volume of compression fluid in the storage chambers 10,12 determines the pressure of gas in the storage chambers 10,12. FIG. 1 illustrates a partial cutaway view of the storage chambers 10,12 and it can be seen that the first storage chamber 10 is substantially full of hydraulic oil, whereas the second storage chamber 12 contains a significant amount of gas which has displaced the hydraulic oil. In some examples, the storage chambers 10,12 may be provided with a separator, for example a membrane or diaphragm or piston separator, to ensure that the hydraulic oil and gas in the storage chambers are truly separated and that no mixing or contamination can occur. Such separator components can also provide sensor data regarding the fill level of the hydraulic fluid and/or gas within the storage chambers.

The gas supply system 4 includes a first valve arrangement 14, shown at the top of the image with respect to the first and second chambers 10,12. The first valve arrangement 14 is configured to control the flow of gas selectively to the first and second chambers 10,12 from a main gas tank 16 (seen in FIG. 3). The main gas tank 16 is the main supply of gaseous fuel in the vehicle which is configured with a suitable valve system (not shown) to receive gas during a filling operation. The first valve arrangement 14 is also configured to control the delivery of pressurised gas, from either one of the storage chambers 10,12 selectively, to the power plant 6.

The gas supply system 4 also includes a second valve arrangement 18, which is shown at the bottom of the image with respect to the first and second storage chambers 10,12. The second valve arrangement 18 is configured to control the flow of hydraulic oil selectively to and from the first and second storage chambers 10,12. Filling the storage chambers 10,12 with hydraulic oil causes the gas within the storage chambers to compress, whereas evacuating hydraulic oil from the storage chambers 10,12 allows gas to be admitted into the storage chambers 10, 12 to refill them. The hydraulic oil therefore acts as a compression fluid since it serves to compress the gas that is also within the respective storage chamber. Herein, the terms 'hydraulic oil', 'hydraulic fluid', 'hydraulic liquid' and 'compression fluid' or liquid should be considered synonymous. In some embodiments, the storage chambers may include a separator such as a membrane or piston between the gas and the hydraulic fluid. However, such a separator is not essential.

The gas supply system 4 further includes a hydraulic pump 20, a hydraulic motor 22, and a reservoir 26 for hydraulic fluid. The hydraulic pump 20 and the hydraulic motor 22 may be a gear pump or other suitable type of hydraulic machine.

The hydraulic pump 20 is coupled to the first and second storage chambers 10,12 through the second valve arrangement 18 such that hydraulic fluid may be delivered to either of the chambers 10,12 by suitable operation of the second valve arrangement 18.

The hydraulic motor 22 is also coupled to the first and second storage chambers 10, 12 through the second valve arrangement 18 such that hydraulic fluid may be evacuated from the storage chamber 10,12 through the hydraulic motor 20. It should be appreciated therefore that the energy in the hydraulic fluid provides some energy to the hydraulic motor 22.

Notably, the hydraulic pump 20 and the hydraulic motor 22 are coupled to one another so that mechanical energy generated by the hydraulic motor 22 is used to drive, at least partially, the hydraulic pump 20. More specifically, the hydraulic pump 20 includes two drive inputs. A first drive input 30 or 'primary drive input' may be provided by a power take off from the power plant, for example a gear driven or belt driven connection to an internal combustion engine. A possible, although less likely example is that the first drive input 30 may be driven by an electric motor. A second drive input 32 or 'secondary drive input' is provided by the hydraulic motor 22. As can be seen from FIG. 1, the primary drive input 30 is an input drive shaft 34 into the hydraulic pump 20, whilst the secondary drive input 34 is provided by a gear wheel 36 which meshes with a gear wheel output 38 of the hydraulic motor 22.

Primarily, therefore, the hydraulic pump 20 is powered by the first drive input 30, that is either by an electric motor or by the power plant 6. However, when hydraulic fluid is evacuated from the first or second storage tank 10, 12 through the hydraulic motor 22, energy is recovered from the hydraulic fluid as it drives the hydraulic pump 20 by way of the hydraulic motor 22. This provides an efficiency benefit since when the storage chambers are in the process of being filled with gas, the hydraulic fluid displaced from those storage chamber due to the pressure of the incoming gas is not simply returned to the reservoir 26, but is caused to return energy to the hydraulic pump 20 via the hydraulic motor 22, thereby recovering a portion of the stored energy.

Advantageously, it is believed that the energy recovery opportunity provided by the hydraulic motor can improve the efficiency of the system significantly, particular where the ratio between input and outlet gas pressure is close to 1.

Having described the gas supply system 4 at a high level, the fluid connections of the first storage chamber 10 and the second storage chamber 12 will now be described in more detail.

The first valve arrangement 14 controls gas flow from a low-pressure pipe 40 into the first and second storage chambers 10,12. The low-pressure pipe 40 feeds gas from the main gas tank 16 to the gas supply system 4. The low-pressure pipe includes a first branch 40*a* and second branch 40*b*. The first branch 40*a* is coupled to the first storage chamber 10 by a first inlet valve 42. The second branch 40*b* is coupled to the second storage chamber 12 by a second inlet valve 44. The first and second inlet valves 42,44 may be one-way check valves (i.e. non-return valves).

The first valve arrangement 14 also controls gas flow from the first and second storage chambers 10,12 to a high-pressure pipe 50. The high-pressure pipe 50 feeds gas from the first and second storage chambers 10,12 to the gas power plant 6. The high-pressure pipe 50 has first and second branches 50*a*,50*b*. A third outlet valve 52 controls fuel flow between the first storage chamber 10 and the first branch 50*a* of the pipe 50. A fourth outlet valve 54 controls fuel flow between the second storage chamber 12 and the second branch 50*b* of the high-pressure pipe 50. The third and fourth inlet valves 52,54 may be one-way check valves (i.e. non-return valves). Note at this point that the valves 42,44,52,54 are pressure operated check valves, but they also may be electronically operated by the ECU 8.

Whereas the first valve arrangement 14 controls the flow of gas to and from the first and second storage chambers 10,12, the second valve arrangement 18 controls the flow of hydraulic fluid to and from the first and second storage chambers 10,12.

In the illustrated example, the second valve arrangement 18 comprises four control valves in total. First and second fluid control valves 56,58 control fluid communication between the hydraulic reservoir 26, the hydraulic pump 20 and each one of the first and second storage chambers 10,12, and are located in respective branches 60*a*,60*b* of a first hydraulic pipe 60. Third and fourth control valves 62,64 are located in respective branches 66*a*,66*b* of a second hydraulic pipe 66 and control fluid communication from the first and second storage chambers 10,12 to the hydraulic motor 22 and the hydraulic reservoir 26. The four control valves 56,58,62,64 are preferably electronically-controlled valves under the control of the ECU 8 (see FIG. 3). This enables full control of the operation of the hydraulic pump 20 and the hydraulic motor 22.

In addition to the four fluid control valves 56,58.62,64, the gas supply system 4 further comprises a safety valve 70 and a priming valve 72. Both the safety valve 70 and the priming valve 72 are electronically-controlled valves, in the illustrated examples, which are controlled by the ECU 8 depending on the operational mode of the gas supply system 4 as will become apparent later in this discussion. The safety valve 70 is in a separate branch pipe 60*c* leading from the branch pipes 60*a*,60*b* to the reservoir 26. The priming valve 72 is in a separate branch pipe 66*c* leading from the branch pipes 66*a*,66*b* to the reservoir 26.

Although not shown in the Figures, it should be appreciate that various sensors, such as flow sensors and pressure sensors may be provided in the system in order for the ECU 8 to monitor the effective operation of the system and configure the control valves accordingly. For example, the ECU 8 should be able to identify the volumes of gas and hydraulic fluid in the storage chambers in order to command filling and emptying of the storage chambers. One way in which this may be achieved is for the storage chambers 10,12 to incorporate a separator between the gas and the hydraulic fluid. The separator may be a flexible component such as a membrane or bladder, or it may be rigid, e.g. in the form of a piston.

The gas supply system 4 has several different modes of operation in which the second valve arrangement 18 is controlled appropriately to achieve a pressurised flow of gas from either the first storage chamber 10 or from the second storage chamber 12. Furthermore, additional control modes function to top up the level of hydraulic fluid in the system, or to drain the hydraulic fluid from the system. The different modes of operation will now be described below.

Normal Mode of Operation—Gas Supply from First Storage Chamber:

A first mode of operation will now be described with reference to FIG. 3. As can be seen, in FIG. 3, the first storage chamber 10 is substantially full of gas (shown in the upper portion of the storage chamber), whereas the second storage chamber 12 is substantially empty of gas but substantially full of compression fluid (shown in the lower portion of the chamber).

In the first mode of operation, the second valve arrangement 18 is controlled in order to deliver a flow of pressurised gas to the power plant 6 from the first storage chamber 10.

For this purpose, the first control valve 56 of the second valve arrangement 18 is in an open position (enabling flow therethrough) whilst the second control valve 58 of the second valve arrangement 18 is in a closed position (no flow). Furthermore, the third control valve 62 is in a closed position (no flow) and the fourth control valve 64 is in an open position (flow enabled). In FIG. 3, it will be appreciated that a flow of fluid through a pipe is designated by solid arrows, whilst a lack of flow is designated with dotted lines.

Operation of the hydraulic pump therefore causes hydraulic fluid to flow from the reservoir 26 through the hydraulic pump 20 and the first control valve 56 to the first storage chamber 10. The hydraulic fluid compresses the gas in the first storage chamber 10, and the pressurised gas flows through the first valve arrangement 14 to the power plant 6. More specifically, the pressurised gas flow through the first outlet valve 52 to the high pressure pipe 50.

It should be appreciated at this point that the demand for gas by the power plant typically varies depending on the load placed on the power plant. Therefore, the ECU 8 is operable to control the hydraulic pump 20 to deliver the required volume of gaseous fuel.

At the same time as gas is being supplied from the first storage chamber 10, hydraulic fluid flows from the second storage chamber 12 through the fourth control valve 64 and the hydraulic motor 22, to the hydraulic reservoir 26. This has the effect of drawing in gas into the second storage chamber 12 from the supply pipe 40. Therefore, as gas is delivered from the first storage chamber 10, the second storage chamber 12 is being filled with gas.

Figure 4:
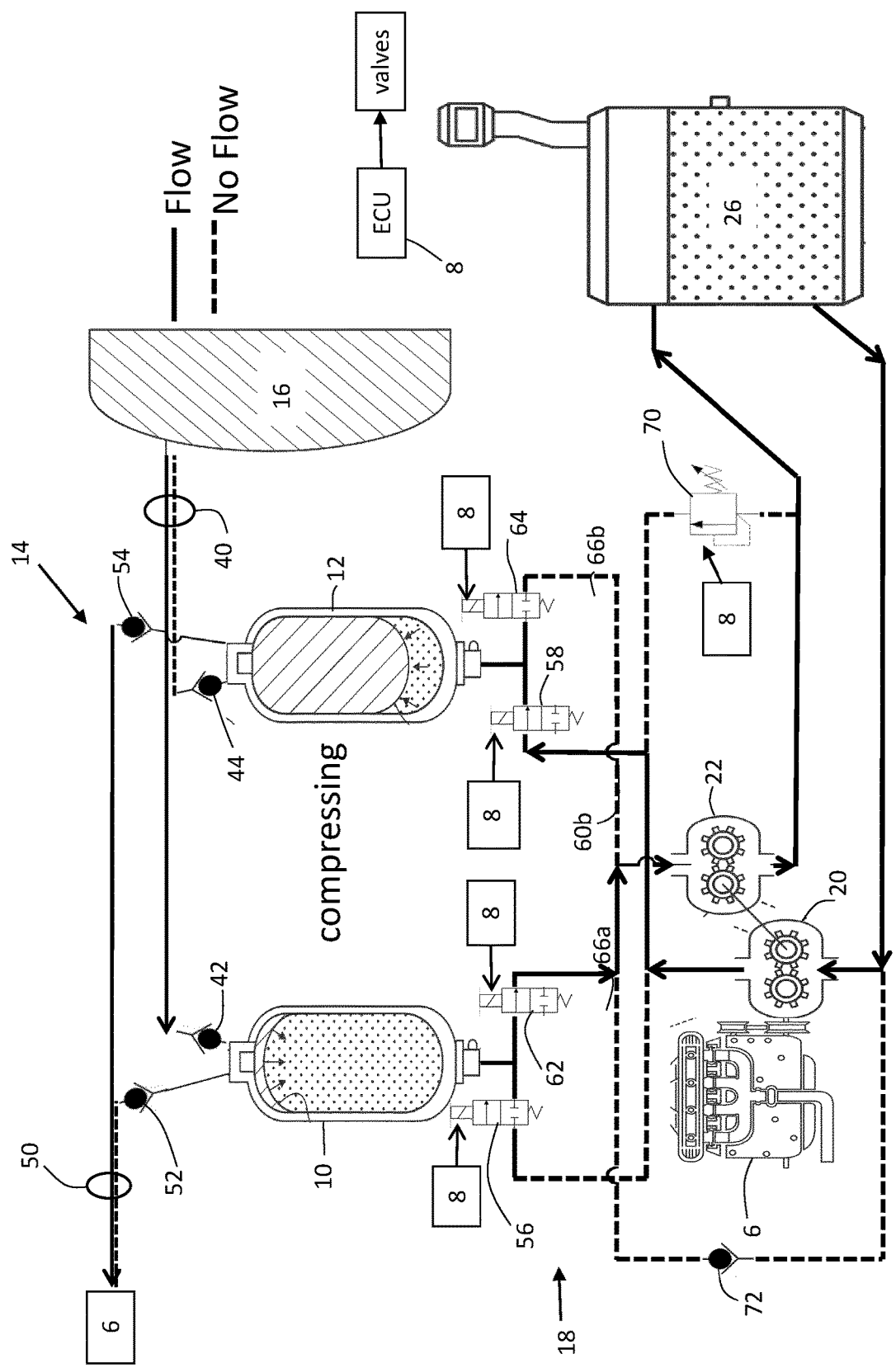

Normal Mode of Operation—Gas Supply to Power Plant from Second Storage Chamber:

With reference to FIG. 4, in the second mode of operation, the second valve arrangement 18 is controlled in order to deliver a flow of pressurised gas to the power plant 6 from the second storage chamber 12.

To this end, the first control valve 56 of the second valve arrangement 18 is in a closed position (no flow) whilst the second control valve 58 of the second valve arrangement 18 is in an open position (flow enabled). Furthermore, the third control valve 62 is in an open position (flow enabled) and the fourth control valve 64 is in a closed position (no flow).

Operation of the hydraulic pump 20 therefore causes hydraulic fluid to flow from the reservoir 26 through the hydraulic pump 20 and the second control valve 58 to the second storage chamber 12. The hydraulic fluid compresses the gas in the second storage chamber 12, and the pressurised gas flows through the first valve arrangement 14 to the power plant 6. More specifically, the pressurised gas flows through the second outlet valve 54 to the high pressure pipe 50.

At the same time as gas is being supplied from the second storage chamber 12, hydraulic fluid flows from the first storage chamber 10 through the third control valve 62 and then also through the hydraulic motor 22, to the hydraulic reservoir 26. This has the effect of drawing in gas into the first storage chamber 10 from the supply pipe 40 through the control valve 42. Therefore, as gas is delivered from the second storage chamber 12 to the power plant 6, the first storage chamber 10 is being filled with gas.

Considering the first two modes of operation, it should be appreciated that during sustained operation of the power plant 6, the ECU 8 will alternate between the two modes of operation continuously to provide a continuous supply of high-pressure gas to the power plant 6. In this way, gas can be supplied to the power plant 6 from one of the two storage chambers 10,12, whilst the other storage chamber is being replenished with gas. During the replenishment, however, the hydraulic fluid from the depleted storage chamber is fed through the hydraulic motor 22 which recovers some of the energy from the hydraulic fluid to help drive the hydraulic pump 20. This reduces parasitic losses of operating the system thereby improving its efficiency.

Idle Mode of Operation—Recirculation of Hydraulic Fluid Through Second Valve Arrangement:

The first and second modes of operation are configured for providing a supply of pressurised gas to the power plant 6 from either the first or second storage chambers 10,12, as required, when the power plant 6 is operating. However, certain circumstances during operation of the power plant 6 may dictate that gas does not need to be supplied to the power plant 6, for example, to the fuel rail or fuel injectors of the power plant. This may be because there is an over-pressure in the fuel rail meaning that it does not need to be supplied with gas for a period of time, or the vehicle may be coasting downhill, in which case the power plant 6 is not required to produce power for the purposes of propulsion. In such circumstances, the ECU 8 may control the second valve arrangement 18 to cause the hydraulic fluid to circulate between the reservoir 26, the second valve arrangement 18, and the hydraulic pump 20.

Figure 5:
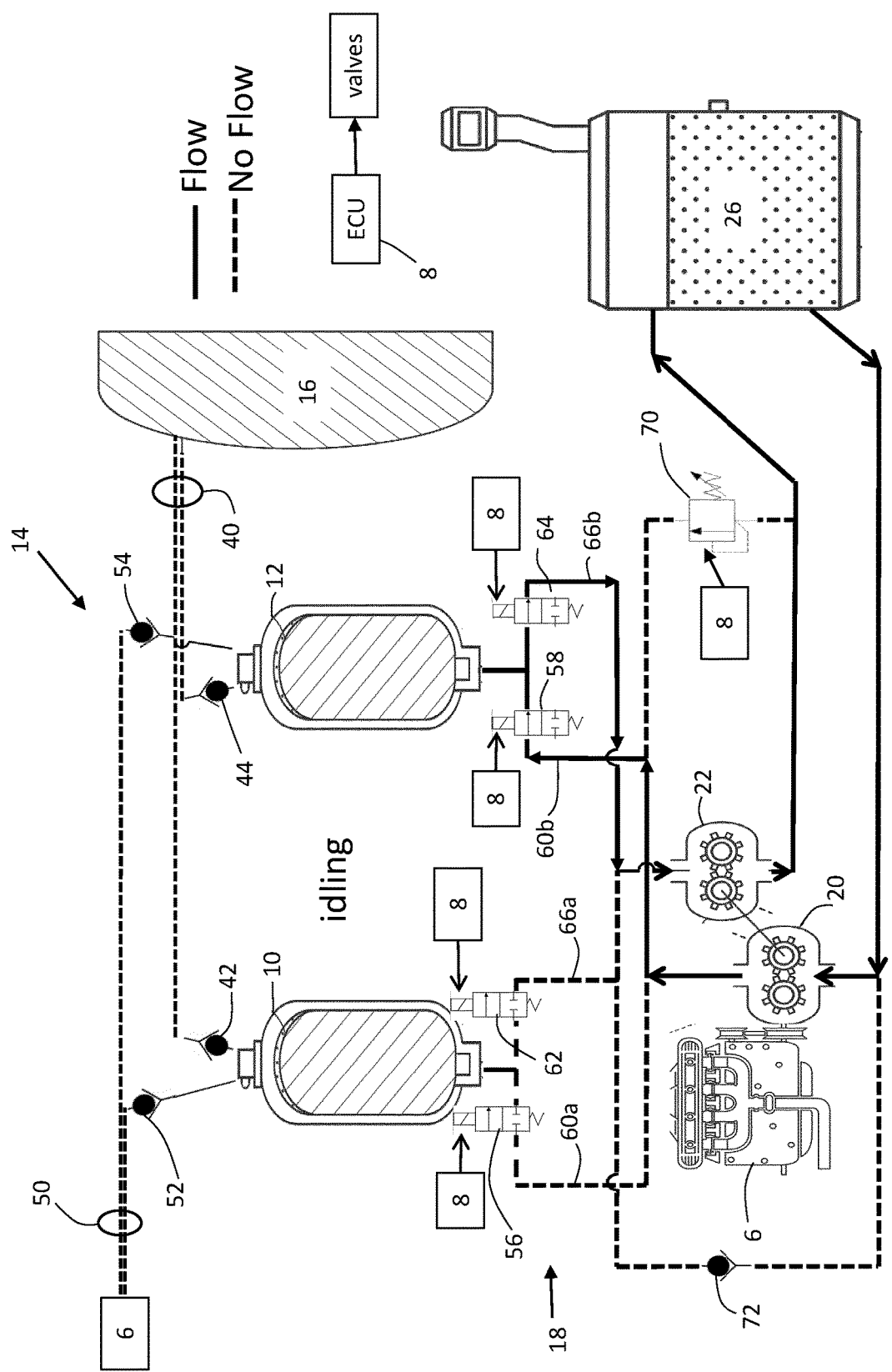
FIG. 5 is a schematic view of the system in an idling mode of operation.

This operational mode is shown in FIG. 5. Here, the first and second control valves 56,58 of the second valve arrangement 18 are in the closed/open positions, respectively, whilst the third and fourth control valves 62, 64, are in the closed/open position, respectively. Thus, the hydraulic oil circulates past the inlet of the second storage chamber 12.

The skilled person would appreciate at this point that the 'idling mode of operation could also be achieved by setting the valves of the second control valve arrangement to the opposite positions as discussed above with respect to FIG. 5 which would cause compression fluid to flow past the inlet of the first storage chamber 10.

Priming Mode of Operation:

A further mode of operation may be understood as a means to 'prime' one or both of the storage chambers 10,12 by filling them or 'topping up' with hydraulic fluid. This may be required to top up the volume of hydraulic fluid in the storage chambers 10,12 to replace hydraulic fluid lost from the storage chambers due to leakage past system tolerances, and leakages through the hydraulic pump 20 and hydraulic motor 22, for example.

Figure 6:
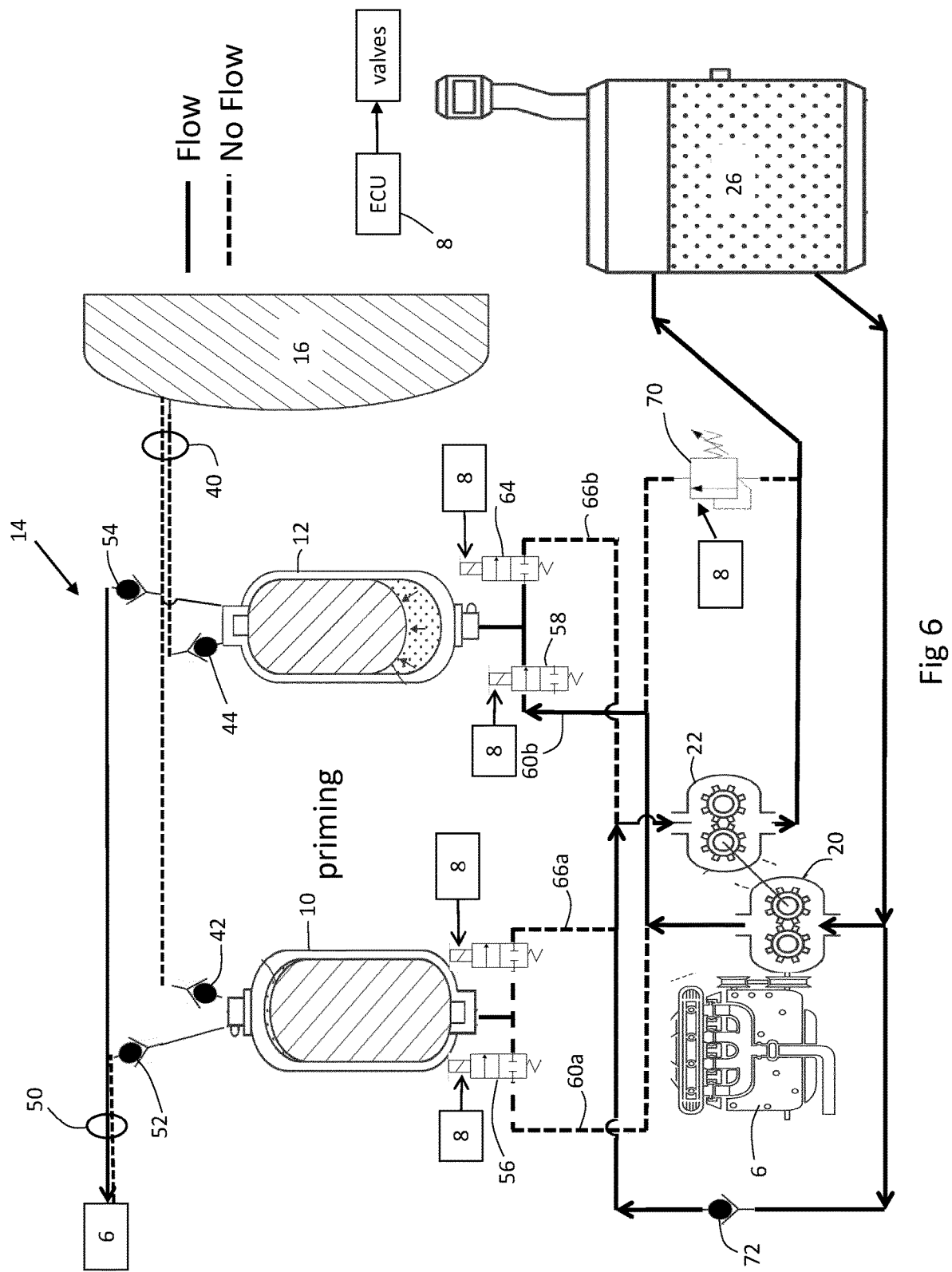
FIG. 6 is a schematic view of the system in a priming or 'filling' mode of operation.

An example of the system being in the 'priming' operation mode is shown in FIG. 6, in which the second storage chamber 12 is being filled with hydraulic fluid, although gas is not being supplied to the power plant 6 by the first valve arrangement 14.

As will be noted in FIG. 6, the second control valve 58 of the second valve arrangement 18 is in the open (flow enabled) position whilst the first and third and fourth control valves 56,62,64 are in the closed (no flow) position. With the valve positions configured in this way, hydraulic fluid is drawn from the reservoir 26 through the hydraulic pump 20 and the second control valve 58 and to the second storage chamber 12. It should also be noted that the priming valve 72 is active in this situation because the third and fourth control valves 62,64 are in the closed position. The priming valve 72 therefore allows hydraulic fluid to circulate through the hydraulic motor 22 during the priming operation to avoid pressure build-up in the system.

It will be appreciated that a similar filling operation may be performed on the first storage chamber 10, in which case the first control valve 56 of the second valve arrangement 18 would be in the open (flow enabled) whereas the second, third and fourth control valve 58,62,64 would be placed in the closed positions (no flow).

Figure 7:
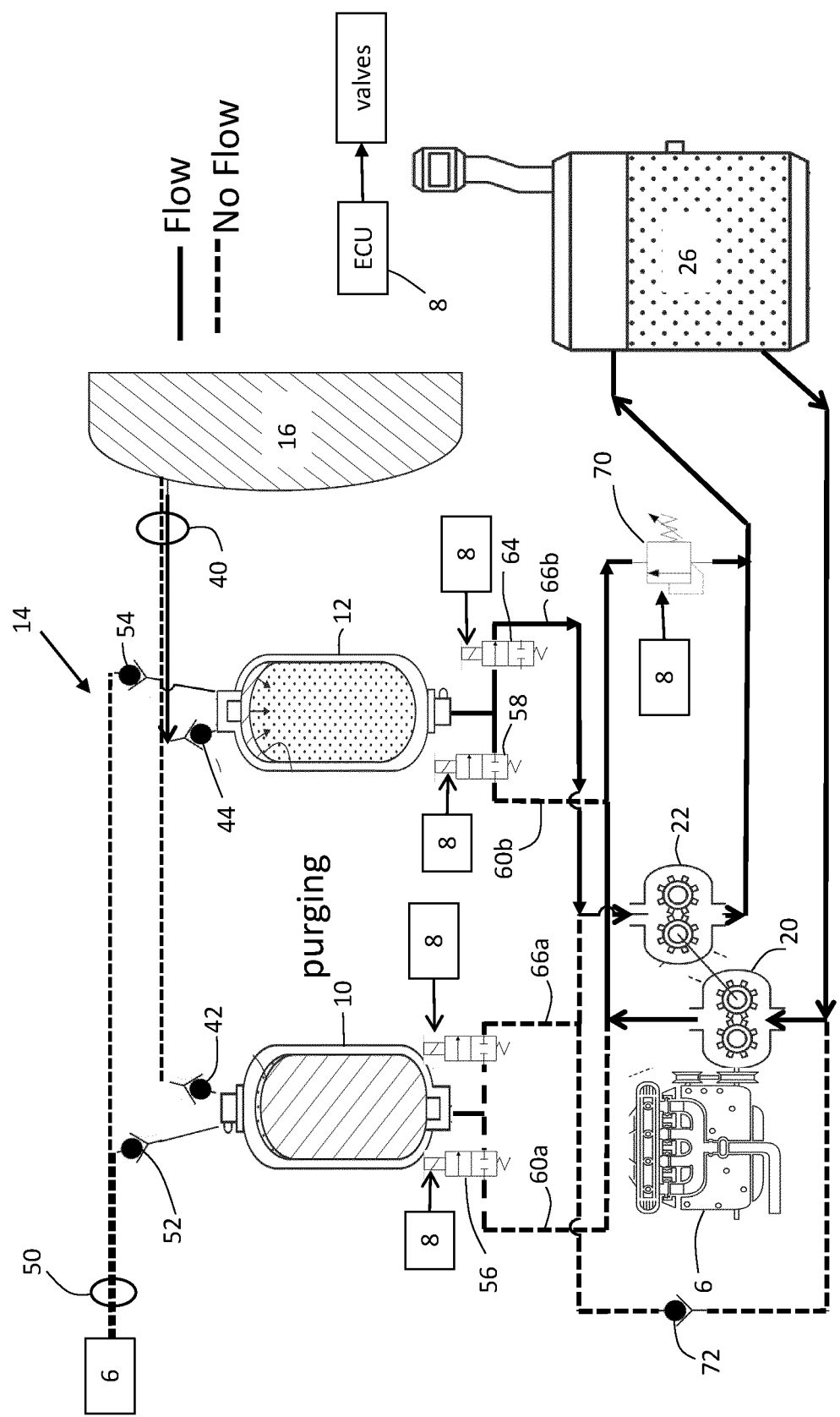
FIG. 7 is a schematic view of the system in a purging or 'emptying' mode of operation.

Purging Mode of Operation:

A further mode of operation is shown in FIG. 7, which may be understood as a 'purging' or 'emptying' mode of operation. This mode of operation may be required in order to reduce the volume of hydraulic fluid in either of the first or second storage chambers 10, 12. This may be due to a need to empty the storage chambers of hydraulic fluid completely, or only partially which may be due to an excess of hydraulic fluid in one or both of the storage chambers.

In FIG. 7, the first storage chamber 10 is substantially empty of hydraulic fluid, and of gas, whilst the second storage chamber 12 is substantially full of hydraulic fluid and empty of gas. The first, second and third control valves 56,58,62 of the second valve arrangement 18 are in the closed (no flow) position whilst the fourth control valve 64 is in the open (flow enabled) position. As such, as the hydraulic pump 20 is driven by the engine or the electric motor, the hydraulic motor 22 is also driven since it is coupled to the pump. This has the effect of draining hydraulic fluid from the first storage chamber 10, such that fluid flow from that chamber 10, through the third control valve 62, through the hydraulic motor 22 and to the reservoir 26. Since the hydraulic pump 20 is still able to draw hydraulic fluid from the reservoir 26 in this mode of operation, that fluid is allowed to circulate through the safety valve 70 back to the reservoir.

In a similar way, the first storage chamber 10 may be purged of hydraulic fluid by configuring the third control valve 62 of the second valve arrangement 18 into the open (flow enabled) position, whilst the first, second and fourth control valves, 56,58,64 are set into the closed position. Hydraulic fluid therefore would flow from the first storage chamber 10 through the third control valve 62 and the hydraulic motor 22, to the reservoir 26, thereby reducing the volume of hydraulic fluid in the first storage chamber 10.

Whilst some specific embodiments of the invention have been described above with reference to illustrated examples, the skilled person would understand that various modifications could be made to those specific embodiments without departing from the scope of the invention as defined by the claims.

At this point, it is worth noting that although in the above discussion and illustrated examples the storage chambers and valves are located close to each other, and included in the same assembly, this is for convenience only and the inventive concept as defined in the claims does not impose any restriction on proximity of components.

In another example of the invention, the system could be operated in a so-called 'expander' mode of operation. This could be useful in a situation where the input pressure of gas, for example as is stored in the main gas tank 16 is at a relatively high level, for example at 350 bar or 700 bar as may be received at a filling station, but the pressure of gas required by the power plant is at a lower pressure. In such a situation, the control valves 42,44,52,54 may be controlled by the ECU 8 to regulate the flow of gas supplied to the storage chambers and reduce the pressure of gas supplied to the power plant. In doing so, energy may be recovered into the hydraulic fluid through the first and/or second hydraulic valve arrangements.

The invention claimed is:

1. A gas supply system for supplying gaseous fuel to a power system, comprising:
    a first storage chamber and a second storage chamber, both storage chambers configured to accommodate a portion of gas and a portion of compression fluid,
    a first valve arrangement configured to permit gas to be supplied selectively to the first and second storage chambers from a gas tank and to permit gas to be delivered under pressure selectively from the first and second storage chambers to the power system;
    a second valve arrangement configured to permit compression fluid to be delivered selectively from a compression fluid source to the first and second storage chambers, and to permit compression fluid to be evacuated from the first and second storage chambers to the compression fluid source;
    wherein compression fluid is delivered to the first and second storage chambers via the second valve arrangement by a hydraulic pump having a primary drive input and a secondary drive input,
    and wherein compression fluid is evacuated from the first and second storage chambers via a hydraulic motor having a drive output,
    wherein the drive output of the hydraulic motor is coupled to the secondary drive input of the hydraulic pump, such that when compression fluid is evacuated from the first or second storage chambers through the hydraulic motor, energy is recovered from the compression fluid to drive the hydraulic pump.

2. The gas supply system of claim 1, wherein the primary drive of the hydraulic pump is driven by an electric motor.

3. The gas supply system of claim 1, wherein the primary drive of the hydraulic pump is driven by a power coupling to a vehicle engine.

4. The gas supply system of claim 1, wherein the first valve arrangement includes, for each of the first and second storage chambers, an inlet valve which is operable to control the supply of gas to the respective storage chamber, and an outlet valve operable to control the delivery of gas from the respective storage chamber to the power system.

5. The gas supply system of claim 4, wherein the inlet valves and the outlet valves are one-way check valves.

6. The gas supply system of claim 4, wherein the inlet valves and the outlet valves are computer-controlled valves.

7. The gas supply system of claim 1, wherein the second valve arrangement is operable in a first mode in which compression fluid is pumped by the hydraulic pump into a first one of said first and second storage chambers through the second valve arrangement thereby causing gas to be delivered from the first one of the first and second storage chambers through the first valve arrangement, whilst compression fluid is evacuated by the hydraulic motor through the second valve arrangement from a second one of the first and second storage chambers, causing gas to be drawn into the second one of the first and second storage chambers via the first valve arrangement.

8. The gas supply system of claim 7, wherein the second valve arrangement is operable in a second mode, in which compression fluid is pumped by the hydraulic pump through the second valve arrangement but is not permitted to enter either of the first and second storage chambers, wherein the pumped compression fluid circulates through the second valve arrangement, through the hydraulic motor, and back to the compression fluid source.

9. The gas supply system of claim 8, wherein the second valve arrangement is operable in a third mode, in which compression fluid is pumped by the hydraulic pump through the second valve arrangement so as to fill a first one of the first and second storage chambers with compression fluid, whilst no compression fluid is delivered to or evacuated from a second one of the first and second storage chambers.

10. The gas supply system of any one of claim 9, wherein the second valve arrangement is operable in a fourth mode, in which compression fluid is evacuated by the hydraulic motor from a first one of the first and second storage chambers, through the second valve arrangement, and back to the compression fluid source, whilst no compression fluid is delivered to or evacuated from a second one of the first and second storage chambers.

11. The gas supply system of claim 1, wherein the second valve arrangement comprises, for each one of the first and second storage chambers, a first control valve to control the flow of compression fluid to or from the respective first and second storage chambers, and a second control valve for controlling the flow of compression fluid to or from the respective first and second storage chambers.

12. The gas supply system of claim 11, wherein the first control valves and second control valves are computer-controlled valves and, optionally, are computer-controlled two-way valves.

13. The gas supply system of claim 1, wherein: (i) the power system is an internal combustion engine of a vehicle; (ii) the gas is hydrogen; or (iii) both (i) and (ii).

14. A method of operating a gas supply system, the system comprising a first storage chamber and a second storage chamber, each of which is configured to accommodate a portion of gas and a portion of compression fluid, a first valve arrangement for controlling the volume of gas in the first and second storage chambers, and a second valve arrangement for controlling the volume of compression fluid in the first and second storage chambers, the volume of compression fluid in the respective storage chambers serving to compress the volume of gas therein, the method comprising:
  pumping, using a hydraulic pump, compression fluid selectively to a first one of the first storage chamber and second storage chamber,
  in synchrony with pumping of the compression fluid, evacuating compression fluid selectively from a second one of the first storage chamber and second storage chamber using a hydraulic motor,
  recovering energy from the flow of compression fluid through the hydraulic motor to assist in driving the hydraulic pump.

15. The method of claim 14, further comprising driving the hydraulic pump using an electric motor.

16. The method of claim 14, further comprising driving the hydraulic pump using a power coupling to a vehicle engine.

17. The method of claim 14, further comprising selectively operating the second valve arrangement in a first mode in which compression fluid is pumped by the hydraulic pump into a first one of said first and second storage chambers through the second valve arrangement thereby causing gas to be delivered from the first one of the first and second storage chambers through the first valve arrangement, whilst compression fluid is evacuated by the hydraulic motor through the second valve arrangement from a second one of the first and second storage chambers, causing gas to be drawn into the second one of the first and second storage chambers via the first valve arrangement.

18. The method of claim 17, further comprising selectively operating the second valve arrangement in a second mode, in which compression fluid is pumped by the hydraulic pump through the second valve arrangement but is not permitted to enter either of the first and second storage chambers, wherein the pumped compression fluid circulates through the second valve arrangement, through the hydraulic motor.

19. The method of claim 18, further comprising selectively operating the second valve arrangement in a third mode, in which compression fluid is pumped by the hydraulic pump through the second valve arrangement so as to fill a first one of the first and second storage chambers with compression fluid, whilst no compression fluid is delivered to or evacuated from a second one of the first and second storage chambers.

20. The method of claim 19, further comprising selectively operating the second valve arrangement in a fourth mode, in which compression fluid is evacuated by the hydraulic motor from a first one of the first and second storage chambers, through the second valve arrangement, and back to the compression fluid source, whilst no compression fluid is delivered to or evacuated from a second one of the first and second storage chambers.

* * * * *